United States Patent Office 3,016,757
Patented Jan. 16, 1962

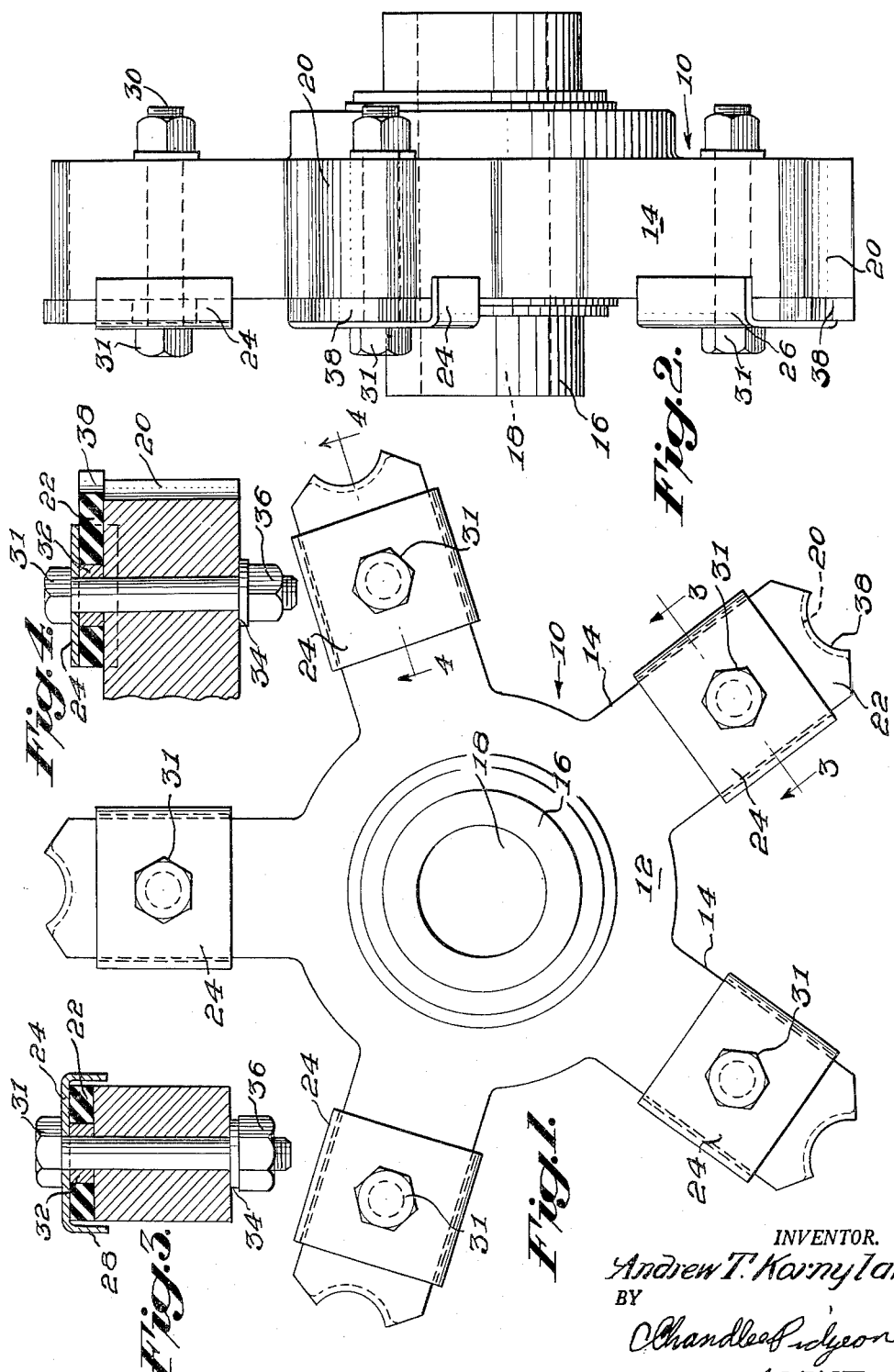

3,016,757
SPROCKET SILENCER
Andrew T. Kornylak, Jersey City, N.J.
(400 Heaton St., Hamilton, Ohio)
Filed Apr. 25, 1961, Ser. No. 105,331
3 Claims. (Cl. 74—243)

This invention relates to a Sprocket Silencer, and more particularly to a device for reducing noise in the driving of conveyor belts composed of interconnected metal slats. The sprocket of this invention is particularly adapted for the driving of metal conveyor belts of the type shown in my copending application, Serial No. 843,139, filed September 29, 1959. It may, however, be used or adapted for use in driving various sprocket chains wherein the sprocket engages a roller or other driving element in operation.

An object of this invention is the provision of a metallic sprocket of the type described having an elastomeric portion which engages a metallic chain tooth or roller before the metal parts contact.

An additional object of this invention is the provision of a sprocket having an elastomeric tooth adjacent a corresponding metal tooth, the elastomeric tooth operating on a slightly greater radius than the corresponding metallic tooth.

These and other objects will become apparent from a consideration of the following specification taken with the accompanying drawings forming a part thereof.

In the drawings, wherein like parts are represented by like characters of reference:

FIG. 1 is an elevation of a sprocket according to this invention;

FIG. 2 is an edge elevation of the sprocket of this invention;

FIG. 3 is a fragmentary section on the line 3—3 of FIG 1, and

FIG. 4 is a fragmentary section on the line 4—4 of FIG. 1.

Referring now to FIG. 1, there is shown the sprocket 10 comprising a web 12 having a plurality of radial arms 14. A hub 16, having an axial opening 18 is provided for mounting the sprocket 10 on a suitable shaft. Each arm 14 is provided with a driving tooth 20 which is adapted to engage a suitable driven element on a chain or conveyor. In this particular instance the teeth 20 are adapted to engage the hinge elements 16 of the conveyor of my copending application, referred to above, or the hinge elements 3 of my Patent No. 2,746,595 issued May 22, 1956.

At one side of each arm 14 I mount a block 22 of elastomeric material which may be rubber or a suitable plastic such as an artificial rubber. Each block 22 is retained in position by means of a clip 24 which has inturned flanges 26, 28 which embrace the edges of the block 22. The clip 24 is retained in position by means of a bolt 30 having a head 31 and which passes through suitable openings in the arm 14 and the clip 24. A spacer 32 has an opening to receive the bolt 30 and is slightly thicker than the elastomeric block 22. The bolt 30 is provided at its end with a washer 34 and a nut 36 whereby the clip 24 is firmly clamped on the arm 14. The radially outer end of the block 22 is provided with a tooth contour 38 like the contour of the tooth 20 but extending a slightly greater distance radially.

In operation, the sprocket 10 rotates and as the teeth 20 are about to engage suitable elements to drive them, the elastomeric tooth portions first contact said elements and thereby reduce and substantially eliminate noise and shock of metallic sprocket teeth engaging metallic driven elements. The slightly thicker space 32 allows the elastomeric tooth member to float in the clip 24 when a load is applied at the tooth portion 38.

Having described my invention, I desire it to be understood that modification may be made within the skill of the art and the scope of the appended claims.

I claim:

1. In a sprocket having a hub, a plurality of radial arms and a driving tooth on the end of each arm, the improvement comprising an auxiliary tooth of elastomeric material at one side of each sprocket tooth, said auxiliary tooth having the same contour as the sprocket tooth, but also having a greater radial extent, whereby the auxiliary tooth engages the driven element before contact therewith of the sprocket tooth.

2. The structure as defined in claim 1, wherein the auxiliary tooth comprises a block of elastomeric material fastened to the radial arm, a clip encompassing the auxiliary tooth and a bolt passing through the clip, the auxilary tooth and the radial arm.

3. The structure as defined in claim 2 including a spacer between the radial arm and the clip, through which the bolt passes, said spacer being thicker than the block of auxiliary tooth, whereby said auxiliary tooth may float when a load is applied thereto.

References Cited in the file of this patent

UNITED STATES PATENTS

| | | |
|---|---|---|
| 538,057 | Willson | Apr. 23, 1895 |
| 975,938 | Downey | Nov. 15, 1910 |
| 1,904,068 | Meacock | Apr. 18, 1933 |
| 2,492,219 | Haefeli | Dec. 27, 1949 |